United States Patent [19]

Black

[11] Patent Number: 5,227,601
[45] Date of Patent: Jul. 13, 1993

[54] ADJUSTABLE WELDING TORCH MOUNTING

[75] Inventor: Thomas J. Black, Middleburg Heights, Ohio

[73] Assignee: The Lincoln Electric Company, Cleveland, Ohio

[21] Appl. No.: 774,831

[22] Filed: Oct. 11, 1991

[51] Int. Cl.$^5$ .............................................. B23K 9/12
[52] U.S. Cl. ................................... 219/61; 219/60 R; 219/124.33; 219/125.11
[58] Field of Search ............ 219/60 R, 60 A, 61, 219/124.33, 125.11

[56] References Cited

U.S. PATENT DOCUMENTS

| | | | |
|---|---|---|---|
| 2,927,195 | 3/1960 | Arnaud | 219/124.33 |
| 3,084,246 | 4/1963 | Rieppel et al. | 219/125 |
| 3,604,612 | 9/1971 | Miller et al. | 228/45 |
| 3,718,798 | 2/1973 | Randolph et al. | 219/60 A |
| 3,737,614 | 6/1973 | Paulange | 219/60 A |
| 3,806,694 | 4/1974 | Nelson et al. | 219/124 |
| 3,815,807 | 6/1974 | Bartley | 219/124.33 |
| 4,008,384 | 2/1977 | Cecil | 219/124.33 |
| 4,495,400 | 1/1985 | Thompson | 219/125.12 |
| 4,664,587 | 5/1987 | Case, Jr. et al. | 219/124.33 |

Primary Examiner—Clifford C. Shaw
Attorney, Agent, or Firm—Body, Vickers & Daniels

[57] ABSTRACT

Automatic welding apparatus of the type comprising a carriage self-propelled along a guide track encircling end-to-end adjoining metal tube sections through a welding pass therearound for forming a weld bead joint therebetween is provided with a welding head pivotally mounted on the carriage for pivotal movement thereon in the plane of the weld joint, about a pivot point located approximately at the tip end of the wire electrode projecting from the nozzle end of the welding head, between an initial forwardly inclined drag angle welding position at the top of the adjoining horizontally disposed tube sections to a rearwardly inclined push angle welding position when the welding head reaches around 120° to 135° of its welding pass around the weld joint.

67 Claims, 8 Drawing Sheets

ADJUSTABLE WELDING TORCH MOUNTING

This invention relates to method and apparatus for adjusting a working tool or welding head into selective angular work or welding positions with respect to a workload, and more particularly to a tube or pipe joint welding method and apparatus having a welding torch or head adjustable into different angular welding positions in the weld plane of the tube or pipe sections at selected stages of the orbital weld pass of the welding apparatus therearound.

Incorporation by Reference

For the purpose of background information, the following United States patents are incorporated by reference herein and made a part hereof: Rieppel et al U.S. Pat. No. 3,084,246; Miller et al U.S. Pat. No. 3,604,612; Randolph et al U.S. Pat. No. 3,718,798; Paulange U.S. Pat. No. 15 3,737,614; Nelson et al U.S. Pat. No. 3,806,694; and Thompson U.S. Pat. No. 4,495,400. These patents constitute a portion of the patented prior art and are incorporated herein to define the background of the present invention so that details known in the art need not be repeated to understand the present invention or appreciate its novelty and substantial contribution to the field of efficient automatic pipeline welding apparatus.

BACKGROUND OF THE INVENTION

In forming pipelines such as conventional gas and oil pipelines, successive lengths or sections of steel pipe are ordinarily welded together in end-to-end relation. The pipe ends are normally outwardly beveled to conjointly form a V-shaped annular groove or welding gap around the end-to-end arranged pipe sections, which gap is then filled with layers of weld metal to form a welded girth joint between the pipe sections.

The joining together of the pipe sections of pipelines by external welded girth joints is presently conventionally performed by automatic pipe welding apparatus such as, for example, that commercially known as the CRC M-200 Automatic Pipeline Welding System made by CRC-Evans Automatic Welding of Houston, Tex., and as disclosed, for instance, in U.S. Pat. No. 3,806,694 to Nelson et al. With this system, a consumable wire electrode is fed from the nozzle tip end of a welding head carried by a self-propelled carriage or so-called buggy which is orbited, during the welding operation, at a controlled speed around the end-to-end arranged pipe sections along a pipe encircling, endless metal band or track secured to one of the pipe sections adjacent the joint to be welded.

In the case where the pipe sections are to be welded together while in horizontally extending position, the wire feeding welding head of the welding apparatus is initially located at the top or twelve o'clock position of the welding gap or channelway between the two end-to-end arranged pipe sections and, during the continuance of the orbital welding pass of the apparatus around the pipe sections, is carried at a controlled speed along the track to the bottom or six o'clock position of the welding gap to form therein a layer or bead of weld metal extending half way around the welding gap between the two adjoining pipe sections. A second welding head carriage or buggy, which is reverse handed from the first one, is then mounted on the track at a top position thereon and moved therealong through a welding pass in the other direction around the welding gap to form a layer or bead of weld metal extending around the other half of the welding gap between the adjoining pipe sections and complete a full pipe encircling weld bead. Successive welding passes of the welding head carriages are then made in their respective directions from top to bottom along the carriage track to lay down successive layers of weld metal sufficient to fill the welding gap and form a composite final weld bead completely therearound constituting the welded girth joint of the pipe sections.

To assure the production of proper weld bead shape and placement, which is important for required X-ray quality and grain refinement to produce needed mechanical properties, the welding head and associated wire electrode are maintained, at the outset of each pass of the respective welding carriages, at a lead or drag angle of around 15° or so to and in the plane of the weld joint, with the wire electrode tilted forwardly in the direction of movement thereof. At approximately the four-o'clock position of the welding head and wire electrode during each downward welding pass of the welding carriage, corresponding to approximately 120° of movement of the welding head around the weld gap, the welding angle of the welding head and its protruding wire electrode is then changed to an approximately 15° push or lag angle to the weld gap, with the wire electrode and welding head tilted rearwardly of the direction of movement of the welding head. The drag angle of the electrode wire on the upper part of the pipe, i.e. from the twelve o'clock to the four o'clock or 120° position, holds back the weld metal and slag, resulting in optimum weld bead shape throughout this upper portion of the weld gap. The following push angle of the wire electrode on the bottom part of the pipe, i.e. from the four o'clock or 120° position to the six o'clock or 180° position, spreads the arc, controls penetration, reduces the puddle temperature and provides better weld bead shape throughout the lower portion of the weld gap. Without the proper wire electrode angle, the correct bead shape and placement cannot be achieved, and the result will be poor X-ray quality and inconsistent mechanical properties. It is important that this change of angle of the welding head and its protruding wire electrode be made with no change in position of the arc or variation in the travel speed, in order to deposit a uniform weld bead with no change in cross-section or shape.

Heretofore, so far as known, the welding angle of the welding head and nozzle of prior automatic pipeline welders for making welded girth pipe joints could be changed only by stopping the welding operation at the four o'clock or 120° position of the welding head during each welding pass thereof around the pipe joint, unloosening the fastening of the welding head to the carriage frame, readjusting and resetting the welding head to the desired new welding angle position on the carriage frame, and then refastening the welding head in the reset new welding angle position on the carriage frame for the restart and continuance of the welding pass through the remaining portion thereof. This interruption of the welding operation, during the successive welding passes of the welding head and manual resetting of the welding angle position of the welding head, not only prolonged the time required for completing the welded girth pipe joint but also resulted in poorly formed joints having non-uniform weld beads of poor quality and placement in the weld gap.

SUMMARY OF THE INVENTION

The present invention contemplates new and improved automatic pipe welding apparatus which overcomes all of the above referred to problems and others and permits easy and quick changing of the angle position of the welding head in the plane of the girth pipe joint without any change in position of the welding arc or variation in travel speed of the welding head along the welding gap between the adjoining pipe sections and without any interruption of the orbital welding pass of the welding head.

Briefly stated, in accordance with one aspect of the invention, the wire electrode feed or welding head of a conventional self-propelled carriage type automatic pipe joint welding device is mounted on the carriage thereof for free angular pivoting movement thereon, in the plane of the pipe joint and about a fixed pivot point on the axis of the welding head spaced slightly beyond the nozzle tip end thereof, between a lead or drag angle welding position tilted forwardly of the direction of orbital travel of the carriage around the pipe joint and an oppositely angled push or lag angle welding position tilted rearwardly of the direction of the carriage orbital travel, without requiring any stoppage or interruption of the orbital welding pass of the welding device around the pipe joint. The tilted lead and lag angle welding positions of the welding head and wire electrode preferably lie at angles of 15° or so to each respective side of the radius or perpendicular to the pipe sections passing through the pivot point of the welding head.

In accordance with another aspect of the invention, the pivotal mounting for the welding head on the carriage may consist of an arcuate plate cam on the welding head having concentric arcuate cam edge surfaces extending parallel to the plane of the weld joint and respectively supported by and riding along and between a pair of concentric arcuately arranged sets of guide rollers rotatably mounted on the frame of the carriage and disposed within the plane of the cam edge surfaces. The arcuate cam edge surfaces of the arcuate plate cam and their engaging arcuately arranged sets of guide rollers are centered on a common axis which extends perpendicular to the plane of the pipe joint and which includes and defines the pivot point of the angular pivotal movement of the welding head on the carriage. Suitable actuating means are provided on the frame of the carriage for pivoting the plate cam on its supporting guide roller sets to change the angular position of the welding head on the carriage in the plane of the pipe joint, preferably during the continuation and without interruption of its welding pass around the pipe joint, from its initial forwardly inclined drag angle welding position of around 15° to the perpendicular at the start of each welding pass of the welding head around the pipe joint beginning at the top thereof, to an oppositely angled rearwardly inclined push angle welding position of around 15° to the perpendicular at around 120° of the welding pass travel of the welding head around the pipe joint, corresponding to approximately the four o'clock position of the welding head in its welding pass around the pipe joint. The actuating means for pivoting the welding head between its two angular welding positions may be manually operative, or motor driven, screw driven, or solenoid actuated, and is operative to permit changing of the angular welding position of the welding head during the continuance and without any interruption of the welding pass of the welding head around the pipe joint.

In accordance with still another aspect of the invention, the actuating means for pivoting the plate cam and associated welding head between the respective approximate 15° drag and push angular welding positions of the welding head relative to the pipe joint may suitably comprise a rack gear on the arcuate plate cam of the welding head and an intermeshing pinion gear on a manually operative or motor driven actuating shaft journaled or mounted on the carriage frame.

In accordance with a further aspect of the invention, a modified pivotal mounting for the welding head on the frame of the carriage may comprise opposed sets of arcuately arranged guide rollers rotatably mounted on the welding head and disposed in a plane parallel to the weld joint and engaged with and riding between an opposed pair of concentric arcuate guide rails or tracks secured to the carriage frame and disposed within the said plane, the guide rails and arcuately arranged sets of guide rollers being centered on a common axis extending perpendicular to the plane of the pipe joint and including the pivot point of the welding head which is located on the axis thereof and offset just beyond its tip end. The actuating means for pivoting the so pivotally mounted welding head may simply comprise a manually operative handle extending from a bracket on the welding head which carries the guide rollers.

In accordance with a still further aspect of the invention, another modified pivotal mounting for the welding head on the frame of the carriage comprises a parallelogram linkage comprised of four link members pivotally interconnected in a parallelogram manner and including a pair of parallel extending side link members and a pair of parallel extending end link members one of which comprises the welding head with its welding tip end extending outwardly beyond the linkage, the other end link member extending outwardly beyond the linkage in the same direction therefrom as the welding head tip end and being pivotally connected to the carriage frame to pivotally mount the linkage for pivotal movement thereon in a plane parallel to the plane of the pipe joint and about a pivot center located on the other end link member the same distance from the linkage as the distance therefrom of the desired pivot point of the welding head on the carriage frame located on the axis of the welding head just beyond the tip end thereof. To guide and further support the welding head during the pivotal movement thereof by the linkage mechanism, the welding head is provided with a pair of guide rollers spaced apart axially thereof and engaged and riding between a pair of opposed, concentrically disposed, arcuate guide rails or tracks on the carriage frame which extend parallel to the plane of the weld joint and are centered on an axis extending perpendicular to the plane of the pipe joint and including the said pivot point of the welding head. The actuating means for pivoting the linkage mounted welding head may comprise a solenoid which is mounted on the carriage frame and the plunger or armature of which is pivotally connected to the said other end link member of the linkage.

The principal object of the invention is to provide a pivotal mounting arrangement for a working tool or welding head which will permit easy and quick changing of the angle position of the working tool or welding head in the plane of and during its operating travel movement without any change in position of the tool point or welding arc or variation in the travel speed of the working tool or welding head along the workpath thereof and preferably without any interruption of the operation of the working tool or welding head.

Another object of the invention is to provide an automatic apparatus for welding together end-to-end adjoining metal tubes or pipe sections by girth type welded joints and having a welding head the angled welding position of which relative to and in the plane of the weld joint can be gradually changed by pivotal movement of the welding head at a selected stage during and preferably without any interruption of the weld pass of the apparatus along the weld joint and about a pivot point located just beyond the tip end of the welding head.

Still another object of the invention is to provide an automatic pipeline welding apparatus of the character referred to above having a welding head mounted on the traveling carriage of the apparatus for pivotal movement thereon in the plane of its welding pass around the adjoining pipe sections and about a pivot point located on the axis of the welding head offset just beyond the tip end thereof.

A further object of the invention is to provide an automatic pipeline welding apparatus of the character referred to above with a welding head which can be pivoted in the plane of its welding pass around two end-to-end adjoining pipe sections to be welded together, about a fixed pivot point on the axis of the welding head offset just beyond the tip end thereof, and set in a different angular welding position during the continuation of the welding pass without any interruption thereof.

A still further object of the invention is to provide an automatic pipeline welding apparatus of the character referred to above for making girth pipe joints and having a welding head pivotally mounted on the apparatus carriage for pivotal movement thereon in the plane of the pipe joint, about a fixed pivot point on the axis of the welding head and offset just beyond the tip end of the welding head, between an initial forwardly inclined drag angle welding position in the plane of the pipe joint at the outset of the weld pass of the welding head around the pipe joint and a subsequent oppositely angled rearwardly inclined push angle welding position in the plane of the pipe joint during and at a selected stage of and preferably without any interruption in the weld pass of the welding head around the pipe joint.

Yet another object of the invention is to provide an automatic pipeline welding apparatus of the character referred to above and having automatically operating actuating means for pivotally shifting the welding head on the traveling carriage of the apparatus from its initial forwardly inclined drag angle welding position to a rearwardly inclined push angle welding position at a selected stage of the travel of the carriage around the adjoining pipe sections during the welding operation.

A further object of the invention is to provide an automatic pipeline welding apparatus of the character referred to above and having manually operative actuating means for pivotally shifting the welding head traveling on the carriage of the apparatus from its initial forwardly inclined drag angle welding position to an oppositely angled rearwardly inclined push angle welding position at a selected stage of the travel of the carriage around the adjoining pipe sections during the welding operation.

A still further object of the invention is to provide an automatic pipeline welding apparatus of the character referred to above and having automatically operating actuating means for pivotally shifting the welding head on the traveling carriage of the apparatus from its initial forwardly inclined drag angle welding position at the top of the welding pass of the carriage around the pipe sections to an oppositely angled rearwardly inclined push angle welding position at a selected stage ranging between about 120° to 135° the welding pass of the welding head around the adjoining pipe sections during the welding operation and preferably without any interruption of the welding pass of the welding head.

Still another object of the invention is to provide a novel method of adjusting the angular welding position of the welding head of a seam joint welding apparatus in the plane of the joint during the welding pass of the welding head therealong.

Further objects and advantages of the invention will appear from the following detailed description of preferred species thereof and from the accompanying drawings.

DESCRIPTION OF THE PREFERRED EMBODIMENTS

Figure 1:
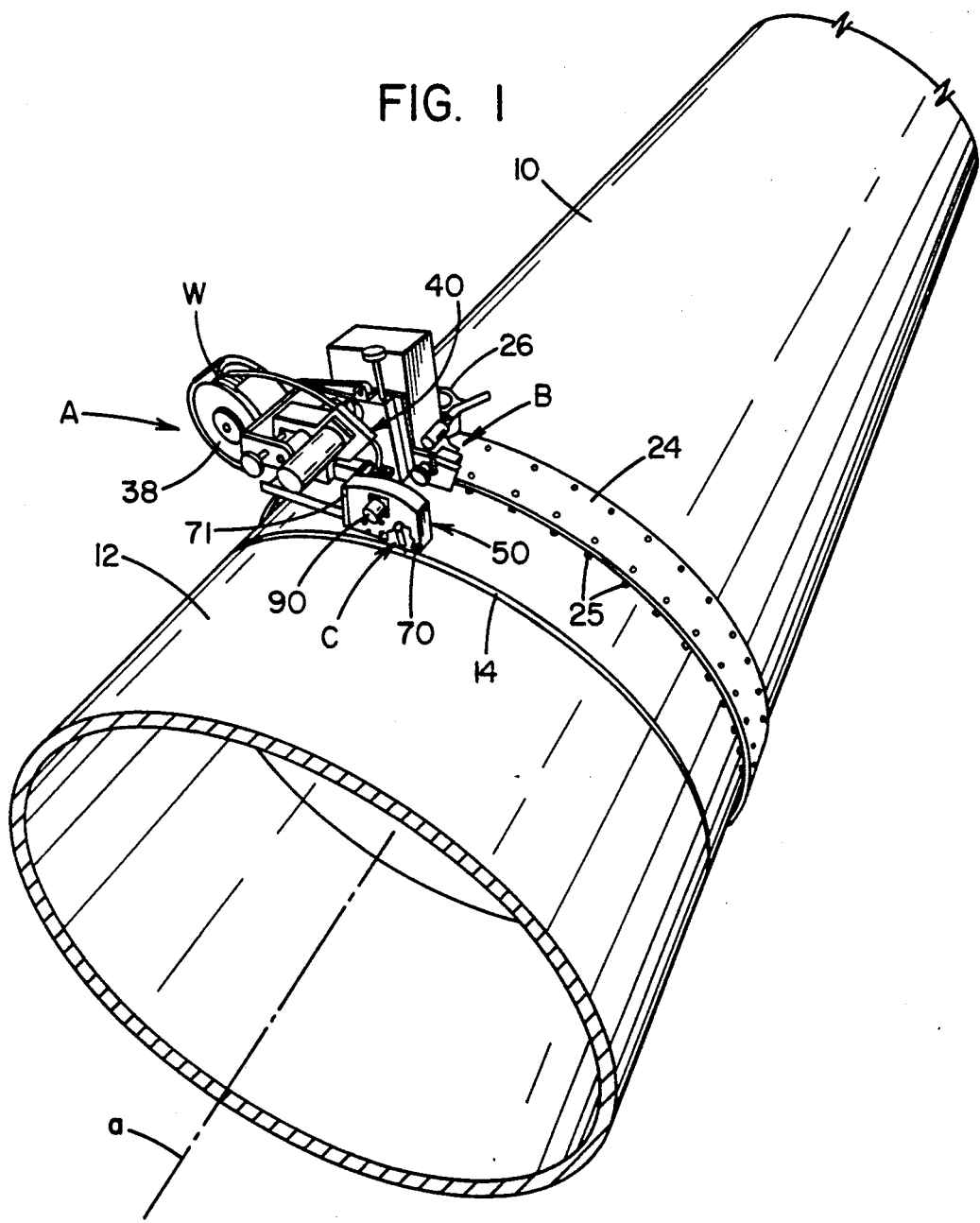
FIG. 1 is a perspective view of self-propelled automatic pipe joint welding apparatus according to the invention mounted in welding position on two end-to-end adjoining pipe sections.
Figure 2:
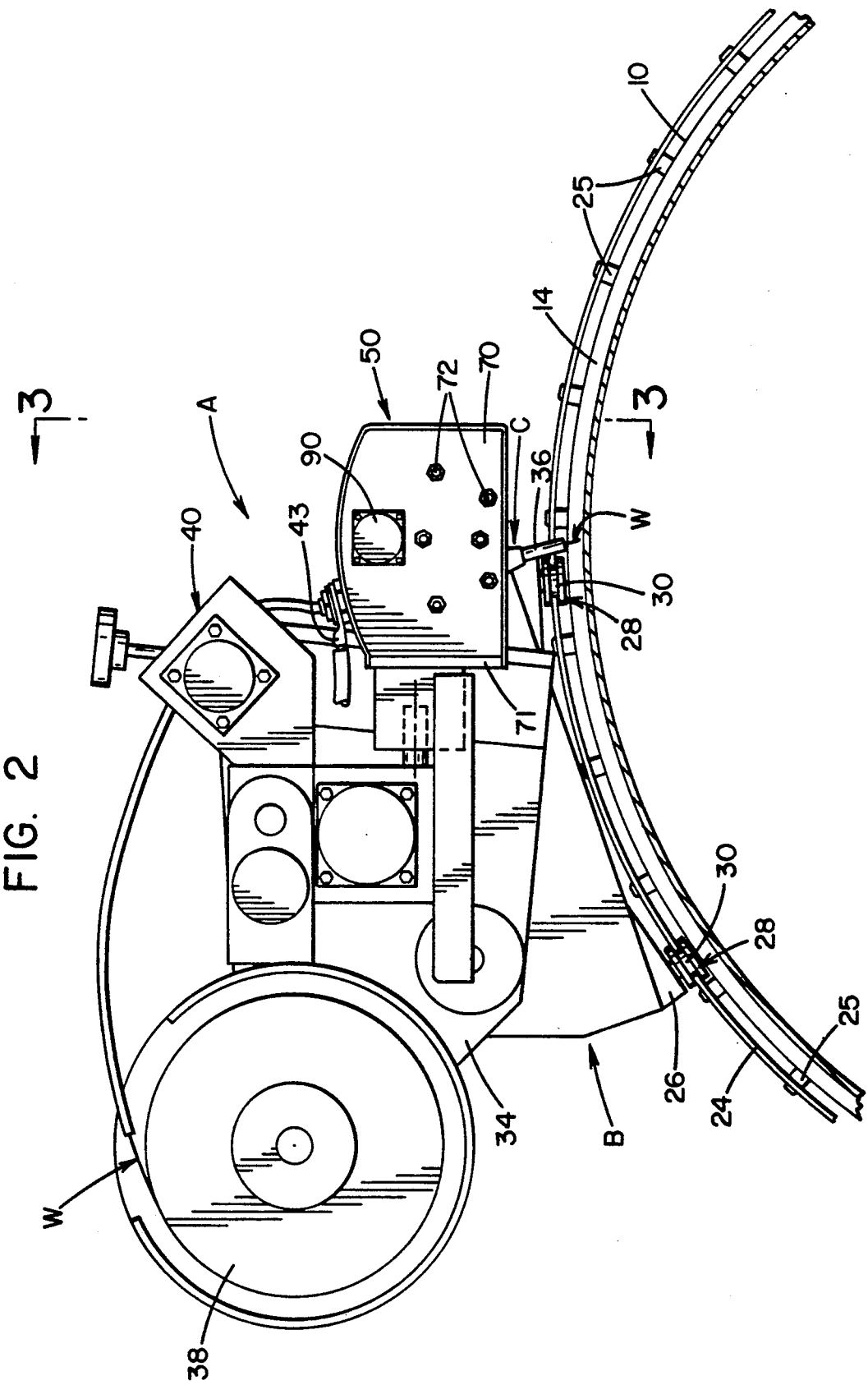
FIG. 2 is a side elevational view of the welding apparatus of FIG. 1 with one of the pipe sections shown in cross-section.

Referring now to the drawings wherein the showings are for the purposes of illustrating the preferred embodiments of the invention only and not for the purposes of limiting the same, FIG. 1 shows an automatic welding apparatus A according to the invention mounted in welding position on two end-to-end adjoining steel tube or pipe sections 10 and 12 for a weld pass around the weld gap 14 therebetween to form a weld bead 16 (FIG. 5) therein constituting a girth weld joint 18 serving to join the pipe sections together completely around their adjoining ends 20, 22. The welding apparatus A may be of the general type commercially known as the CRC M200 Automatic Pipeline Welding System as referred to hereinabove and as disclosed, for instance, in U.S. Pat. No. 3,806,694 to Nelson et al, and comprising a carriage B adapted to be mounted on and self-propelled along a pipe encircling endless track or band 24 which is fitted and fixed under tension around one of the pipe sections, e.g. pipe section 10, at a location spaced a fixed short distance from and in a position extending parallel to the weld gap 14. Band 24 is spaced radially from but concentric with respect to the pipe section 10 by feet or stud members 25 carried by the band. The carriage B comprises a frame 26 carrying a plurality of rotatably mounted, peripherally grooved, guide rollers 28 which are adapted to be spring pressed against the opposite side edges of the track 24, with the track fitting snugly within the peripheral grooves 30 of the rollers, to support the carriage B in place on the track. One of the support rollers 28 is adapted to be rotatably driven by a motor-speed reducer unit 32 mounted on the carriage B to self-propel the carriage at a controlled uniform speed along the track 24 in a path parallel to the weld gap 14 during a weld pass around the pipe 10. The carriage B is provided with means (not shown) for disengaging the spring pressed support rollers 28 from the track 24 to permit the removal of the carriage therefrom as well as mounting thereon.

The frame 26 of the carriage B includes a side plate or frame member 34 on which is mounted a welding head C having a welding nozzle end 36 to which a consumable electrode wire W is fed from a supply reel 38 thereof rotatably mounted on the side plate member 34. The electrode wire W is fed off the reel 38 to the welding nozzle end 36 of the welding head C at a controlled rate, during the welding pass of the carriage B around the weld gap 14, by conventional wire feed means 40 such as shown and described in the aforementioned U.S. Pat. No. 3,806,694. The welding head C is mounted on the side plate member 34 of the carriage for limited lateral oscillation movement relative to the weld gap 14 during the welding operation by conventional oscillating mechanism (not shown) acting to move the welding head C cyclically from side-to-side of the weld gap 14 as the welding carriage travels in orbit around the pipe joint, as shown by the two way arrow 42 in FIG. 5. The wire electrode W fed through the welding head C is connected in the customary manner by an electrical conductor 43 to an electrical power supply for supplying a welding current to the wire electrode. As thus far described, the welding apparatus A is of conventional construction forming no part of the present invention and need not be further described herein.

In accordance with the invention, to permit the previously described setting of the welding head C of the welding apparatus A in its initial lead or drag angle welding position of around 15° or so to and in the plane of the weld joint 18 at the top or 12 o'clock position of the welding apparatus relative to the annular weld joint at the start of each orbital weld pass of the apparatus halfway around the weld joint, and adjustment of the welding head C to a subsequent oppositely angled 15° or so lag or push angle welding position in the plane of the weld joint when the welding head reaches approximately its 4 o'clock position during its downward orbital weld pass around the weld joint corresponding to approximately 120° orbital travel of the welding head and its protruding wire electrode around the weld joint 18 from its initial starting position at the top of the weld joint, the welding head or torch C is mounted on the side plate or frame member 34 of the carriage B for pivotal movement thereon in the plane D (FIG. 3) of the weld joint 18 and about a pivot point P (FIG. 4) located on the axis X of the welding head C offset just beyond the tip end 44 of the nozzle portion 36 of the welding head and approximately at the end 46 (FIG. 4) of the portion 48 of the wire electrode W which normally protrudes a small distance of around $\frac{1}{8}$" to 1.0", typically $\frac{3}{8}$" outwardly beyond the tip end 44 of the welding head nozzle portion 36 during the course of the welding pass of the welding apparatus A around the pipe joint 18. The pivotal mounting of the welding head C on the carriage B of the welding apparatus A is of a form such as to permit the pivoting of the welding head from its initial lead or drag angle welding position inclined forwardly at around 15° or so relative to the direction of orbital travel of the welding head around the weld joint 18 to its subsequent lag or push angle welding position inclined rearwardly at around 15° or so relative to the direction of orbital travel of the welding head around the weld joint 18 during the continued, and at approximately 120° or so of the orbital travel of the welding head through its welding pass, and without any interruption of the welding operation. This assures the formation of a uniform weld bead 16 of high quality with no change in cross-section or shape.

Figure 3:
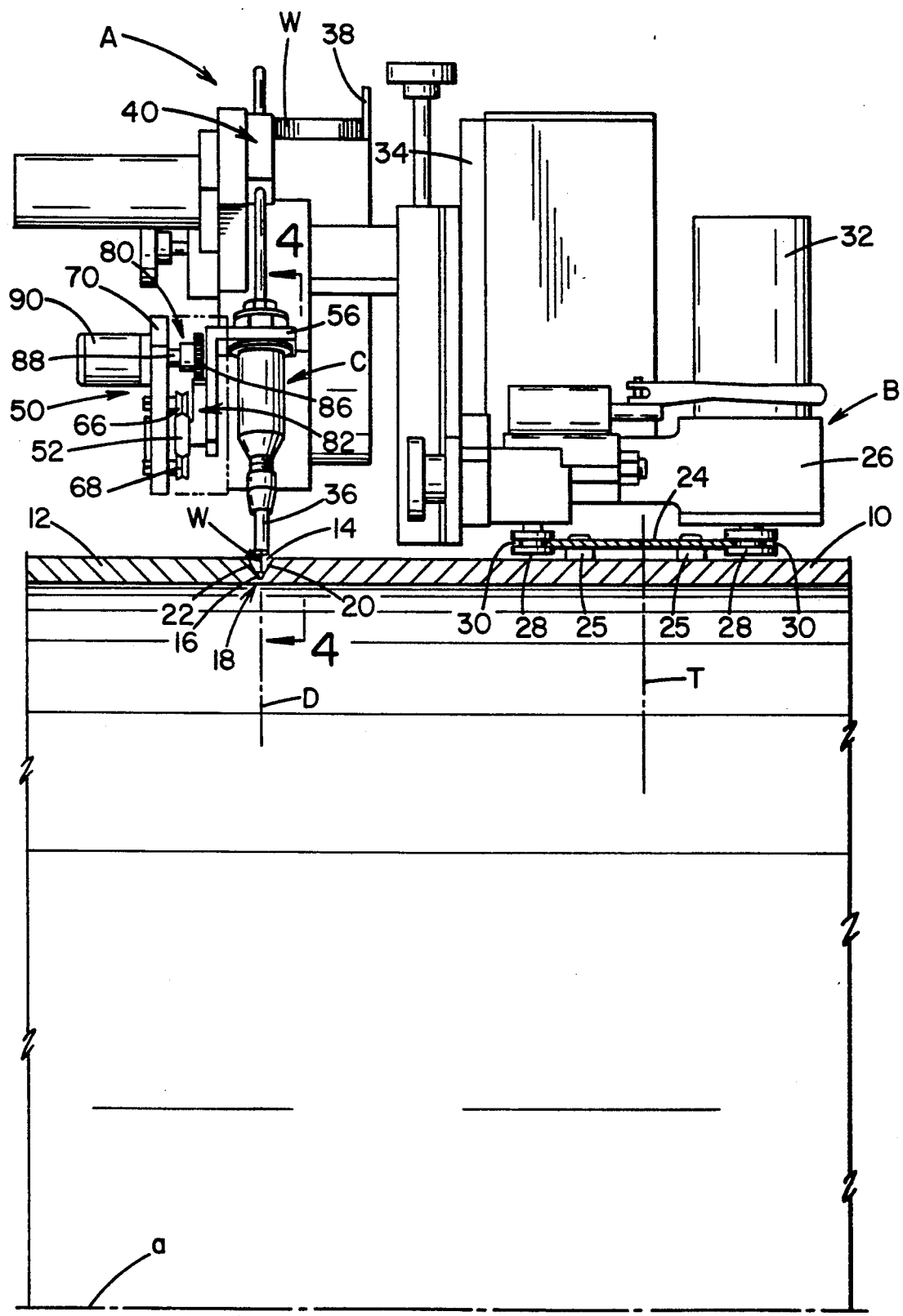
FIG. 3 is an end elevational view of the welding apparatus of FIG. 1 shown mounted in welding position on one of the pipe sections shown fragmentarily in axial section.
Figure 4:
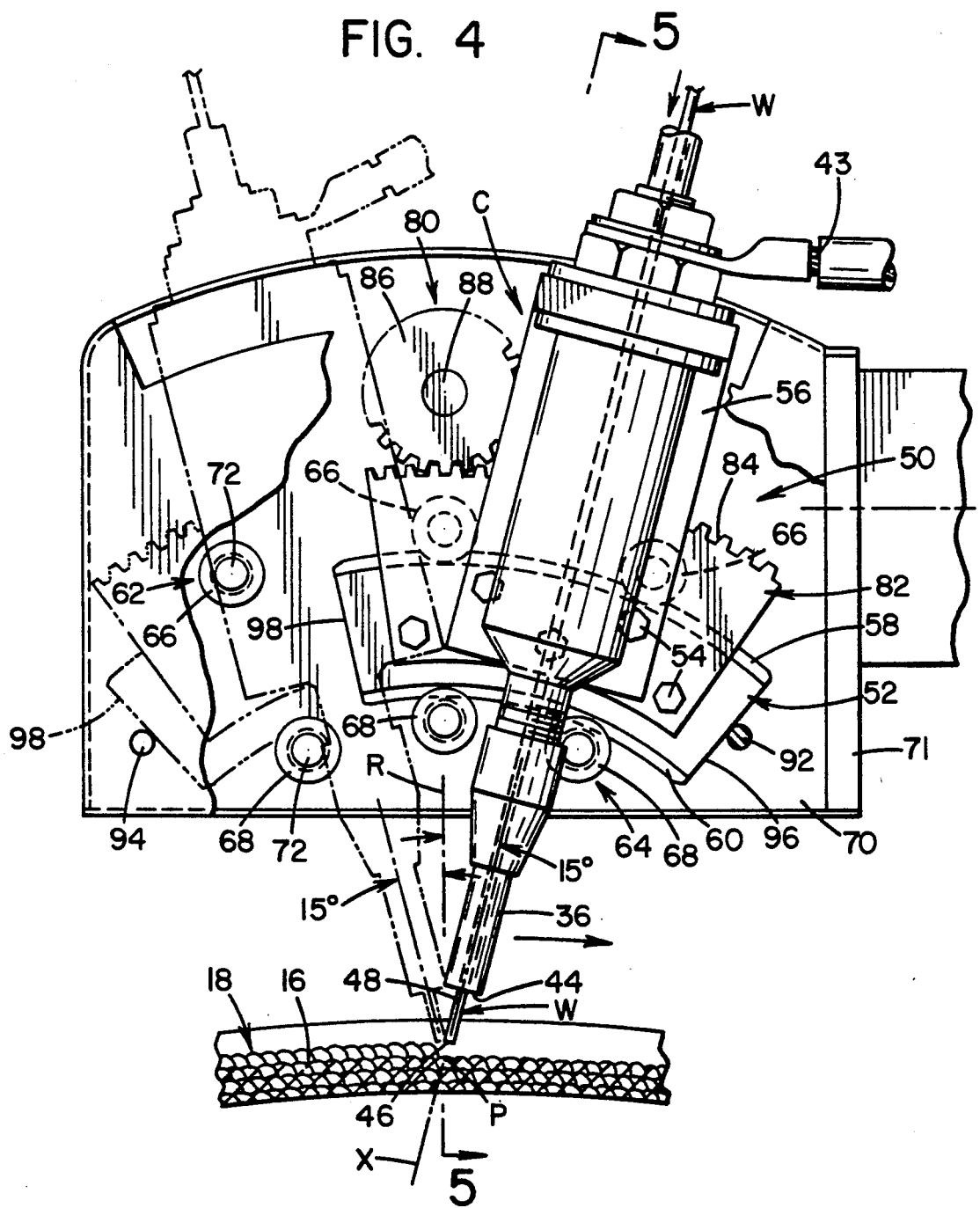
FIG. 4 is an enlarged front elevational view of the welding torch and its pivotal mounting on the carriage of the welding apparatus and showing the welded pipe joint being formed during the initial stages of the weld pass of the welding apparatus around the pipe joint.
Figure 5:
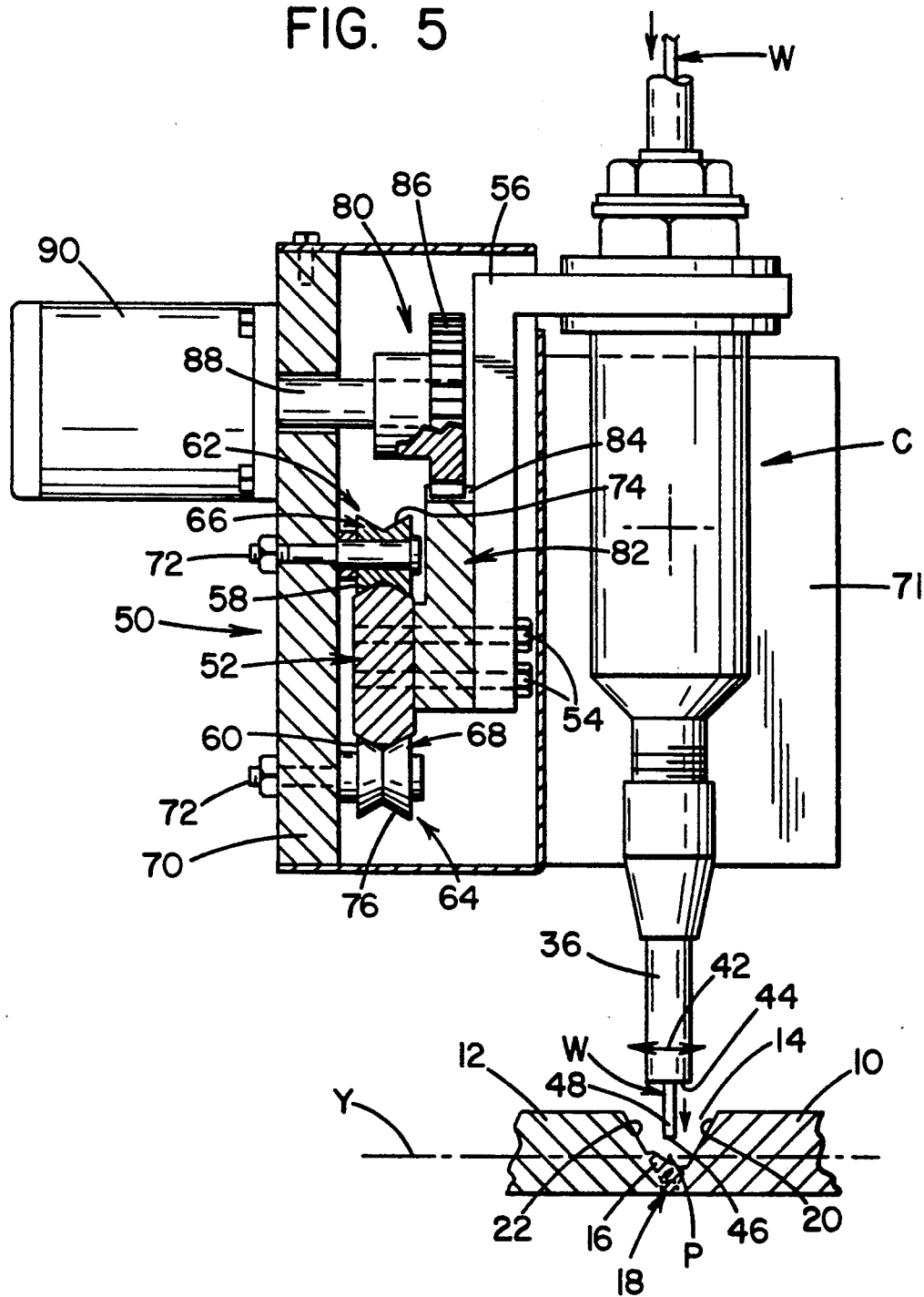
FIG. 5 is an enlarged end elevational view of the welding torch showing in section the pivotal mounting therefor on the carriage of the welding apparatus.

A preferred form of a pivotal mounting arrangement 50 according to the invention for the welding head C is illustrated in FIGS. 3-5. As there shown, the pivotal mounting arrangement 50 for the welding head C comprises an arcuate shaped flat plate cam 52 fastened as by bolts 54 to an L-shaped mounting bracket 56 fixedly secured to the end of the welding head opposite the nozzle end portion 36 thereof. The plate cam 52 is disposed in a plane parallel to the plane T (FIG. 3) of orbital travel of the carriage B around the guide track 24 which plane extends perpendicular to the longitudinal axis a (FIG. 1) of the aligned tube or pipe sections 10, 12. Plate cam 52 has concentric arcuate side cam edge surfaces 58, 60 engaged with and riding between opposed concentric sets 62 and 64 of arcuately arranged guide rollers 66 and 68, e.g. three rollers in each set, which are rotatably mounted on a plate portion 70 of a subframe member 71 secured to the side plate frame member 34 of the carriage frame 26. The guide rollers 66, 68 are pivotally mounted on and fastened to the plate member 70 by fastening shaft bolts 72. The cam edge surfaces 58, 60 of the plate cam 52 and the roller surfaces 74, 76 of the guide rollers 66, 68 engaged therewith are of matching V-shaped form to retain the welding head C in laterally fixed position with respect to the subframe plate member 70.

The arcuate cam edge surfaces 58, 60 of the plate cam 52 and the respective arcuately arranged guide roller sets 62, 64 engaging therewith are centered on a common axis Y extending parallel to the longitudinal axis a (FIG. 1) of the pipe sections 10, 12 and normal to the plane T of travel of the carriage B along the guide track 24 and to the plane of travel of the welding head C around the pipe joint 18, which axis Y includes the pivot point P of the welding head C. As a result, when a force in the plane and direction of travel of the welding head C around the weld joint 18 is applied to the welding head, the engaged cam edge surfaces 58, 60 and sets 62, 64 of guide rollers 66, 68 will guide the welding head in a pivoting movement about the pivot point P.

Actuating means 80 for pivoting the welding head C about the pivot point P and the axis Y comprise an arcuate rack member 82 secured by bolts 54 to and between the mounting bracket 56 of the welding head C and the plate cam 52, and having arcuately arranged rack teeth 84 centered on the axis Y which includes the pivot point P of the welding head C. The rack member 82 is actuated to pivot the welding head C about the pivot point P by a pinion 86 in meshing engagement with the teeth 84 of the rack member. The pinion 86 is mounted on the end of a drive shaft 88 of an electric motorspeed reducer unit 90 mounted on the plate portion 70 of the carriage frame 26. The operation of the motor-speed reducer unit 90 may be controlled by suitable control means (not shown) to pivot the welding head C from its initial lead or drag angle welding position inclined forwardly at an angle of around 15° to the radial plane R (FIG. 4) of the tubing sections 10, 12 passing through the pivot point P of the welding head C and in the plane of and relative to the direction of travel of the welding head around the weld joint 18, at the start of each welding pass of the welding head C therearound, to its oppositely angled lag or push angle welding position inclined rearwardly at an angle of around 15° to the radial plane R and in the plane of and relative to the direction of travel of the welding head around the weld joint 18 when the welding head C reaches approximately the 4 o'clock position of the welding head during its downward welding pass around the weld joint corresponding to approximately 120° to 135° of travel of the welding head during each welding pass thereof. Instead of employing a motor-speed reducer unit 90 to operate the actuating means 80 for pivoting the welding head C between its limiting lead or drag angle welding position and its lag or push angle welding position, the actuating means 80 may be operated manually in which case the drive shaft 88 for the pinion 86 may be journaled in the plate portion 70 of the carriage frame 26 and provided with a hand knob (not shown) for rotating it. Limiting stop pins 92, 94 may be provided on the plate portion 70 of the carriage frame 26 for engagement with the respective ends 96 and 98 of the plate cam 52 to limit the arcuate travel thereof and fix the welding head C in either of its lead or drag angle welding position, or its lag or push angle welding position, during the pivoting thereof by the manually operated actuating means 80.

Figure 6:
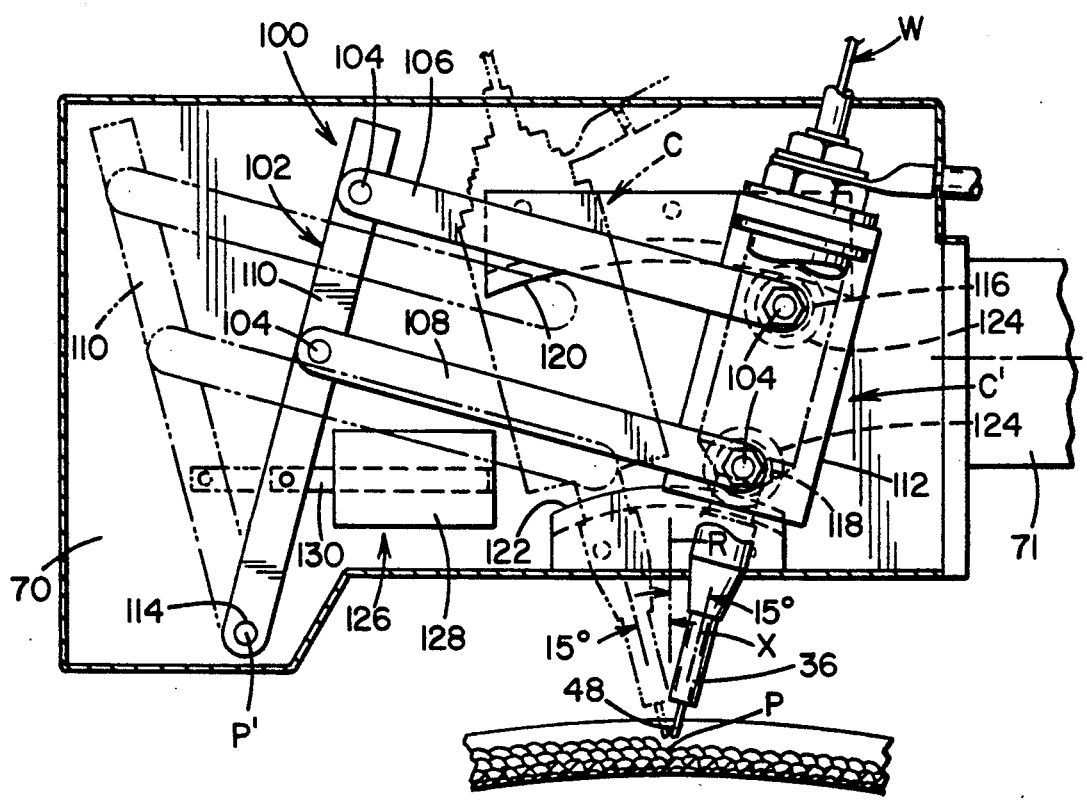
FIG. 6 is a front elevational view of the welding torch showing a modified pivotal mounting therefor on the carriage of the welding apparatus.

FIG. 6 illustrates a modified pivotal mounting arrangement 100 according to the invention for the welding head C', which employs a parallelogram linkage 102 for mounting and pivoting the welding head C' about the pivot point P. The parallelogram linkage 102 is comprised of four link members pivotally interconnected by pivot pins 104 in a parallelogram manner and including a pair of parallel extending side link members 106 and 108 and a pair of parallel extending end link members 110 and 112 one of which, i.e. link member 112, comprises the welding head C' itself with its axis X extending parallel to the other end link member 110 and its nozzle end portion 36 extending outwardly beyond the linkage 102. The other end link member 110 extends outwardly beyond the parallelogram linkage 102 in the same direction as the welding head nozzle end portion 36 and is pivotally connected by a pivot pin 114 to the plate portion 70 of the subframe member 71 of the carriage frame 26 to pivotally mount the linkage 102 on the frame 26 for pivotal movement thereon in the plane of the linkage and in a plane parallel to the plane T of orbital travel of the carriage 26 around the tube or pipe sections 10, 12 and about a pivot center P' located on the other end link member 110 the same distance outwardly of the linkage 102 as the distance therefrom of the pivot point P of the welding head C'.

The welding head C' is provided with a pair of guide rollers 116 and 118 which are rotatably mounted on the welding head in spaced apart relation axially thereof and on opposite sides of the welding head from, and in axial alignment with its pivotal connections 104 to the side link members 106 and 108. The guide rollers 116, 118 are engaged with and ride between a pair of opposed concentric arcuate guide rails 120 and 122 fastened onto the plate portion 70 of the carriage frame 26 and centered on an axis Y (not shown in FIG. 6) extending parallel to the longitudinal axis A (FIG. 1) of the pipe sections 10, 12 and normal to the plane T of travel of the carriage B along the guide track 24 and to the plane of travel of the welding head C' around the pipe joint 18, which axis Y includes the pivot point P of the welding head C', to support the welding head on the frame. The guide rollers 116, 118 are grooved to provide end flanges 124 engaged with the sides of the guide rails 120, 122 to retain the welding head in laterally fixed position with respect to the plate portion 70 of the carriage subframe member 71.

Actuating means 126 are provided for pivoting the end link member 110 on its pivot pin 114 to pivot the linkage 102 about its pivot point P' and thereby pivot the welding head C' about its pivot point P between its lead or drag angle welding position as shown in solid lines in FIG. 6 inclined forwardly in the plane of the weld joint 18 at an angle of around 15° or so to the radial plane R of the tubing sections 10, 12 and in the direction of travel of the welding head at the start of each downward welding pass of the welding head around the weld joint 18, and its oppositely angled lag or push angle welding position as shown in dash-dot lines in FIG. 6 inclined rearwardly in the plane of the weld joint 18 at an angle of around 15° to the radial plane R of the tube sections 10, 12 and relative to the direction of travel of the welding head in its welding pass after around 120° to 135° of its orbital travel around the weld joint 18 beginning at the top thereof. As shown, the actuating means 126 for operating the linkage 102 to thereby pivot the welding head C' may comprise a solenoid 128 pivotally mounted on the plate portion 70 of the carriage subframe member 71 with its armature or core member 130 pivotally connected to the other end link member 110 of the linkage 102. The energization of the solenoid 128 may be effected manually, or automatically by suitable controller means (not shown), to pivot the linkage 102 and the welding head C' to its lag or push angle welding position when the welding head reaches approximately its 4 o'clock position during its welding pass around the weld joint 18 corresponding to approximately 120° to 135° of its orbital welding pass around the weld joint.

Figure 7:
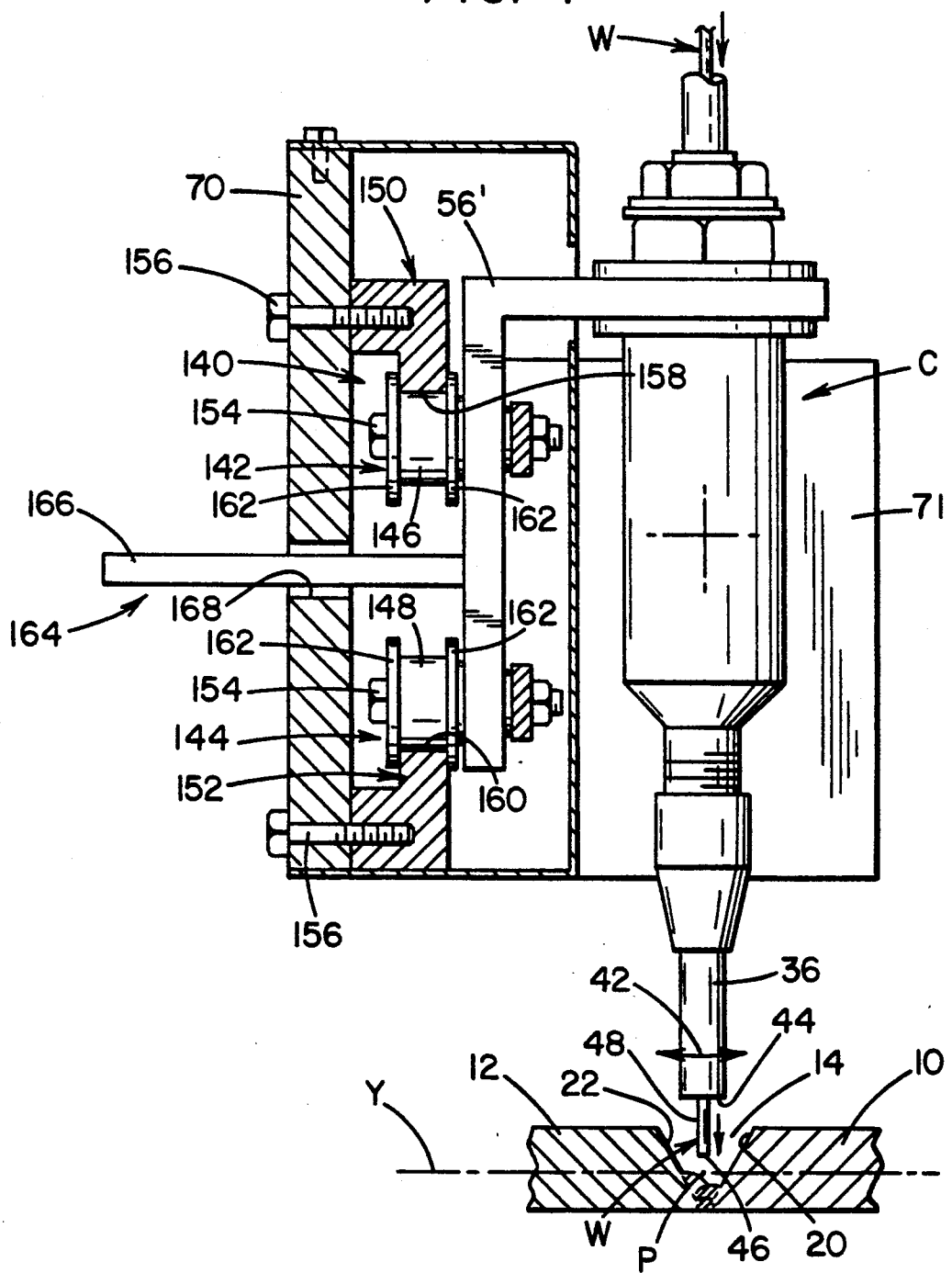
FIG. 7 is an enlarged end elevational view of the welding torch showing in section another modified pivotal mounting therefor on the carriage of the welding apparatus; and, FIGS. 8A–8D are diagrammatic views showing the angular welding positions of the wire electrode of the welding head respectively at the outset or top of each welding pass of the welding apparatus around the pipe joint, then at points in each welding pass just before and just after the pivoting of the welding head from a drag angle welding position to a push angle welding position, and finally at points at the end or bottom of each welding pass of the welding apparatus.

FIG. 7 illustrates a modified pivotal mounting arrangement 140 according to the invention for the welding head C which is similar to the preferred form of mounting arrangement 50 shown in FIGS. 1–5 but differs therefrom in that the opposed concentric sets 142 and 144 of arcuately arranged guide rollers 146 and 148 are rotatably mounted on the mounting bracket 56, secured to the welding head C, and the cooperating opposed pair of concentric guide rail members 150 and 152 engaged with the guide roller sets 142 and 144, respectively, are fastened to the plate portion 70 of the subframe member 71 of the carriage frame 26. The guide rollers 146, 148 are rotatably mounted on the mounting bracket 56' by shaft bolts 154 while the opposed guide rail members 150, 152 are fastened to the plate portion 70 by fastening bolts 156. The guide rail members 150, 152 are formed with opposed concentric arcuate rail edge surfaces 158 and 160 engaged with and between which the arcuately arranged guide rollers 146, 148 ride. The guide rollers 146, 148 are peripherally grooved to form end flanges 162 thereon engaging with the sides of the guide rails 150, 152 to retain the welding head C in laterally fixed position on the subframe 71 of the carriage frame 26.

The concentric arcuate guide rail edge surfaces 158, 160 of the guide rail members 150, 152 and the respective arcuately arranged concentric guide roller sets 142, 144 engaging therewith are centered on a common axis Y extending parallel to the longitudinal axis a of the tube or pipe sections 10, 12 and normal to the plane T of travel of the carriage B along the guide track 24 and to the plane of travel of the welding head C around the pipe joint 18, which axis Y includes the pivot point P of the welding head C. As a result, when a force in the plane and direction of travel of the welding head C around the weld joint 18 is applied to the mounting bracket 56' of the welding head, the engaged guide rail edge surfaces 158, 160 and sets 142, 144 of guide rollers 146, 148 will guide the welding head in a pivoting movement about the pivot point P.

Actuating means 164 are provided for pivoting the welding head C on its pivotal mounting 140. As shown, the actuating means 164 may simply comprise a handle member 166 secured to the mounting bracket 56' of the welding head and projecting through an arcuate slot 168 in the plate portion 70 of the subframe 71, for manually effecting the pivotal movement of the welding head C on its pivotal mounting 140.

Figure 8A:
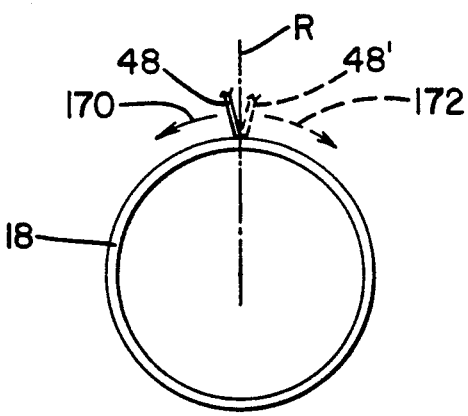
Figure 8B:
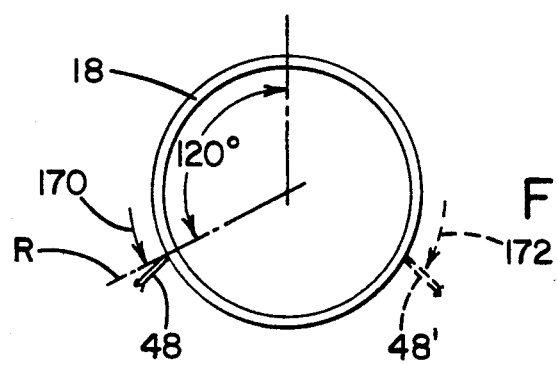
Figure 8C:
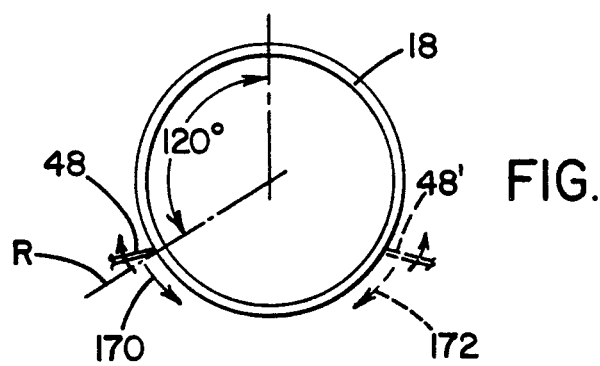
Figure 8D:
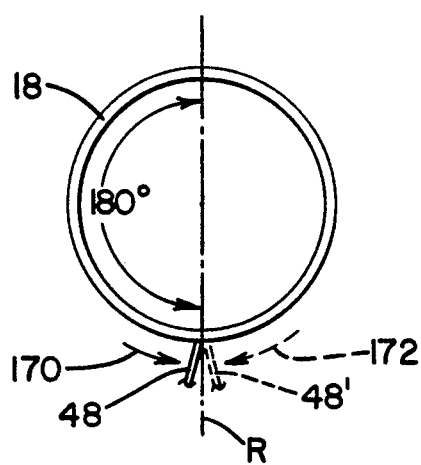

FIGS. 8A–8D diagrammatically show the angled welding positions of the protruding portions 48 and 48' of the wire electrode W in the welding heads C during the course of the travel thereof around the pipe joint 18 by respective carriages B. FIG. 8A shows the welding wire electrode portion 48 in its initial lead or drag angle welding position of around 15° to the radial plane R of the tip end 46 of the welding wire electrode portion 48 at the top of the weld joint 18 in readiness for the start of orbital travel of the carriage B in a counterclockwise welding pass direction halfway around the weld joint 18 as shown by the solid line arrow 170. FIG. 8B shows the welding wire electrode portion 48 in its lead or drag angle welding position relative to the plane R of the tip end 46 of the welding wire electrode portion 48 when the latter reaches approximately its 120° position during the course of its orbital travel in a counterclockwise direction 170 around the pipe joint 18. FIG. 8C shows the welding wire electrode portion 48 in its lag or push angle welding position of around 15° to the radial plane R of the tip end 46 of the wire electrode portion 48 after it has been pivoted to such lag angle welding position by the pivotal movement of the welding head C at the approximate 120° position of the welding head during its orbital travel around the welding joint 18. Because of the pivoting of the welding head C about a pivot point P located at the tip end 46 of the protruding wire electrode portion 48 by the pivotal mounting arrangements 50, 100 or 140 according to the invention, instead of at a pivot point located at some distance radially outward from the welding joint 18 as in prior pipe joint welding head mounting arrangements, there is no need for any back-tracking of the carriage B on its guide track 24, during the orbital welding pass of the welding head around the weld joint, in order to locate the tip end 46 of the lag angle welding position wire electrode portion 48 at the same point it occupied relative to the weld joint 18 at the 120° position of the carriage B while the wire electrode portion 48 was in its original lead or drag angle welding position of around 15° to the radial plane R of the tip end 46 of the wire electrode portion 48 while at such 120° position of the welding head. FIG. 8D shows the welding wire electrode portion 48 in its lag or push angle welding position of around 15° to the radial plane R of the tip end 46 of the wire electrode portion 48 at the bottom of the pipe joint 18, at the end of its 180° orbital welding pass therearound. FIGS. 8A–8D also show the corresponding angle welding positions of the wire electrode portion 48' of a second carriage of reverse handed form from the first carriage B, during its welding pass halfway around the pipe joint 18 in a clockwise direction, as shown by the dashed line arrow 172, to complete the formation of a weld bead 16 completely around the pipe joint.

While the welding apparatus according to the invention has been described hereinabove in connection with the formation of welded pipe joints, it will be appreciated that the disclosed welding apparatus is also adaptable to the formation of other types of welded joints between metal members such as, for instance, the formation of straight line welded joints between two flat metal plate members or sections. In such case, the welding head C is moved by the carriage B back and forth along the length of the weld joint from one end to the other end thereof in a series of welding passes. Where the welding joint extends essentially horizontally, the welding head would be pivoted, at the start of each forward and return welding pass of the welding head along the weld joint so as to always be in a drag angled welding position inclined forwardly of the direction of travel of the welding head along the weld joint. Where the weld joint extends essentially vertically, however, then in that case the welding head C would be initially set and then maintained in a pivoted position so as to be in a push angled welding position inclined rearwardly relative to the direction of travel of the welding head during its downward welding passes along the welding gap and in a drag angled welding position inclined forwardly relative to the direction of travel of the welding head during its return upward welding passes along the welding gap.

Having thus described the invention, it is claimed:

1. Welding apparatus comprising a carriage equipped with a welding head and adapted for mounting on and travel at a controlled speed in an annular welding path along a track encircling end-to-end adjoining metal tube sections and around an annular welding gap therebetween to deposit a weld bead therein, said carriage comprising a support frame on which the said welding head is mounted with its tip end pointing toward the said welding gap, means mounting the said welding head on said support frame for pivotal movement thereon in the plane of its travel around the adjoining pipe sections and about a pivot point located on the axis of the welding head and offset just beyond the tip end thereof, and actuating means operating to pivot the welding head on its said mounting means from an initial angled welding position relative to and in the plane of said welding gap to an oppositely angled welding position in said plane at a selected location of the welding head in its said welding path around the said tube sections to deposit a weld bead in said annular gap.

2. Welding apparatus as defined in claim 1, wherein the said actuating means pivots said welding head on said mounting means from an initial drag angle welding position inclined forwardly relative to the direction of travel of said welding head around the said weld gap between the said tube sections to a push angle welding position inclined rearwardly to the said direction of travel of said welding head around said weld gap.

3. Welding apparatus as defined in claim 2, wherein the said welding head, when in its said drag and push angle welding positions, extends at angles of around 15° to the radius of the tube sections extending through the said pivot point of said welding head.

4. Welding apparatus as defined in claim 3, wherein the said carriage and its said welding head are moved in welding passes each starting at the top and extending halfway around to the bottom of the said annular gap between horizontally disposed end-to-end adjoining tube sections, and the said actuating means automatically pivots the said welding head during each of said welding passes from its said initial drag angle welding position to its said push angle welding position after from about 120° to 135° of the travel of said welding head during each said welding pass.

5. Welding apparatus as defined in claim 4, wherein the said mounting means for said welding head comprises an arcuate shaped plate cam fastened to the said welding head in a plane parallel to the travel thereof around the said tube sections and having concentric arcuate opposite side cam edge surfaces engaged with and riding between opposed concentric sets of arcuately arranged guide rollers rotatably mounted on said carriage frame, the said concentric arcuate cam edge surfaces and arcuately arranged guide roller sets being centered on a common axis extending normal to the plane of travel of said welding head around the said tube sections and including the said pivot point of the welding head.

6. Welding apparatus as defined in claim 5, wherein the said actuating means for pivoting said welding head comprises an arcuate rack secured to said arcuate plate cam and concentric with said arcuate side cam edge surfaces and centered on said common axis, and a gear in meshed engagement with said rack and mounted on an actuating shaft supported on said frame and provided with drive means for rotating said shaft.

7. Welding apparatus as defined in claim 6, wherein the said drive means for rotating said actuating shaft comprises a motor and speed reducer unit.

8. Welding apparatus as defined in claim 6, wherein the said drive means for rotating said actuating shaft comprises a hand knob fastened thereon.

9. Welding apparatus as defined in claim 8, wherein the said arcuate plate cam and the said guide rollers engaged therewith are provided with matching V-shaped engaging surfaces serving to retain the welding head in laterally fixed position on said frame.

10. Welding apparatus as defined in claim 4, wherein the said mounting means for said welding head comprises opposed concentric sets of arcuately arranged guide rollers rotatably mounted on said welding head and engaged with and riding between an opposed pair of concentric arcuate guide rails secured to the said carriage frame, the said concentric arcuate guide rails and arcuately arranged sets of guide rollers being centered on a common axis extending normal to the plane of travel of said welding head around the said tube sections and including the said pivot point of the welding head.

11. Welding apparatus as defined in claim 10, wherein the said actuating means for pivoting the said welding head comprises a lever arm attached to the welding head.

12. Welding apparatus as defined in claim 10, wherein the said guide rollers are provided with end flanges engaging with the sides of said guide rails to retain the welding head in laterally fixed position on said frame.

13. Welding apparatus as defined in claim 4, wherein the said mounting means for said welding head comprises a parallelogram linkage comprised of four link members pivotally interconnected in a a parallelogram manner and including a pair of parallel extending side link members and a pair of parallel extending end link members one of which comprises the said welding head with its axis extending parallel to the other said end link member and its welding nozzle end extending outwardly beyond said linkage, said other end link member extending outwardly of said linkage in the same direction as said welding head nozzle end and being pivotally connected to the said frame to pivotally mount the said linkage for pivotal movement on said frame in the plane of said linkage and in a plane parallel to the plane of the said travel of said carriage around said tube sections and about a pivot center located on said other end link member the same distance from said linkage as the distance therefrom of the said pivot point of the said welding head, said welding head being provided with a pair of guide rollers spaced apart axially thereof and engaged with and riding between a pair of opposed concentric arcuate guide rails on said frame centered on an axis extending normal to the plane of travel of said welding head around the said tube sections and including the said pivot point of said welding head to support the welding head on said frame.

14. Welding apparatus as defined in claim 13, wherein the said guide rollers are provided with end flanges engaging with the sides of said guide rails to retain the welding head in laterally fixed position on said frame.

15. Welding apparatus as defined in claim 4, wherein the said actuating means operates to pivot the said welding head from its said initial drag angle welding position to its said push angle welding position during the continuation of the orbital travel of the said carriage and the welding head in the welding pass thereof around the welding gap without any interruption of the welding operation.

16. Welding apparatus as defined in claim 3, wherein the said mounting means for said welding head comprises an arcuate shaped plate cam fastened to the said welding head in a plane parallel to the plane of travel thereof around the said tube sections and having concentric arcuate opposite side edge cam surfaces engaged with and riding between opposed concentric sets of arcuately arranged guide rollers rotatably mounted on said carriage frame, the said concentric arcuate cam edge surfaces and arcuately arranged guide roller sets being centered on a common axis extending normal to the plane of travel of said welding head around the said tube sections and including the said pivot point of the welding head.

17. Welding apparatus as defined in claim 16, wherein the said actuating means for pivoting said welding head comprises an arcuate rack secured to said arcuate plate cam and concentric with said arcuate side cam edge surfaces and centered on said common axis, and a gear in meshed engagement with said rack and mounted on an actuating shaft supported on said frame and provided with drive means for rotating said shaft.

18. Welding apparatus as defined in claim 17, wherein the said drive means for rotating said actuating shaft comprises a motor and speed reducer unit.

19. Welding apparatus as defined in claim 17, wherein the said drive means for rotating said actuating shaft comprises a hand knob fastened thereon.

20. Welding apparatus as defined in claim 16, wherein the said arcuate plate cam and the said guide rollers engaged therewith are provided with matching V-shaped engaging surfaces serving to retain the welding head in laterally fixed position on said frame.

21. Welding apparatus a defined in claim 3, wherein the said mounting means for said welding head comprises opposed concentric sets of arcuately arranged guide rollers rotatably mounted on said welding head and engaged with and riding between an opposed pair of concentric arcuate guide rails secured to the said carriage frame, the said concentric arcuate guide rails and arcuately arranged sets of guide rollers being centered on a common axis extending normal to the plane of travel of said welding head around the said tube sections and including the said pivot point of the welding head.

22. Welding apparatus as defined in claim 21, wherein the said actuating means for pivoting the said welding head comprises a lever arm attached to the welding head.

23. Welding apparatus as defined in claim 21, wherein the said guide rollers are provided with end flanges engaging with the sides of said guide rails to retain the welding head in laterally fixed position on said frame.

24. Welding apparatus as defined in claim 3, wherein the said mounting means for said welding head comprises a parallelogram linkage comprised of four link members pivotally interconnected in a parallelogram manner and including a pair of parallel extending side link members and a pair of parallel extending end link members one of which comprises the said welding head with its axis extending parallel to the other said end link member and its welding nozzle end extending outwardly beyond said linkage, said other end link member extending outwardly of said linkage in the same direction as said welding head nozzle end and being pivotally connected to the said frame to pivotally mount the said linkage for pivotal movement on said frame in the plane of said linkage and in a plane parallel to the plane of the said travel of said carriage around said tube sections and about a pivot center located on said other end link member the same distance from said linkage as the distance therefrom of the said pivot point of the said welding head, said welding head being provided with a pair of guide rollers spaced apart axially thereof and engaged with and riding between a pair of opposed concentric arcuate guide rails on said frame centered on an axis extending normal to the plane of travel of said welding head around the said tube sections and including the said pivot point of said welding head to support the welding head on said frame.

25. Welding apparatus as defined in claim 24, wherein the said guide rollers are provided with end flanges engaging with the sides of said guide rails to retain the welding head in laterally fixed position on said frame.

26. Welding apparatus as defined in claim 2, wherein the said carriage and its said welding head are moved in welding passes each starting at the top ad extending halfway around to the bottom of the annular weld gap between horizontally disposed end-to-end adjoining tube sections, and the said actuating means automatically pivots the said welding head during each of said welding passes from its said initial drag angle welding position to tis said push angle welding position after from about 120° to 135° of the travel of said welding head during each said welding pass.

27. Welding apparatus as defined in claim 26, wherein the said mounting means for said welding head comprises an arcuate shaped plate cam fastened to the said welding head in a plane parallel to the plane of travel thereof around the said tube sections and having concentric arcuate opposite side edge cam surfaces engaged with and riding between opposed concentric sets of arcuately arranged guide rollers rotatably mounted on said carriage frame, the said concentric arcuate cam edge surfaces and arcuately arranged guide roller sets being centered on a common axis extending normal to the plane of travel of said welding head around the said tube sections and including the said pivot point of the welding head.

28. Welding apparatus as defined in claim 27, wherein the said actuating means for pivoting said welding head comprises an arcuate rack secured to said arcuate plate cam and concentric with said arcuate side cam edge surfaces and centered on said common axis, and a gear in meshed engagement with said rack and mounted on an actuating shaft supported on said frame and provided with drive means for rotating said shaft.

29. Welding apparatus as defined in claim 28, wherein the said drive means for rotating said actuating shaft comprises a motor and speed reducer unit.

30. Welding apparatus as defined in claim 28, wherein the said drive means for rotating said actuating shaft comprises a hand knob fastened thereon.

31. Welding apparatus as defined in claim 30, wherein the said arcuate plate cam and the said guide rollers engaged therewith are provided with matching V-shaped engaging surfaces serving to retain the welding head in laterally fixed position on said frame.

32. Welding apparatus as defined in claim 26, wherein the said mounting means for said welding head comprises opposed concentric sets of arcuately arranged guide rollers rotatably mounted on said welding head and engaged with and riding between an opposed pair of concentric arcuate guide rails secured to the said carriage frame, the said concentric arcuate guide rails and arcuately arranged sets of guide rollers being centered on a common axis extending normal to the plane of travel of said welding head around the said tube sections and including the said pivot point of the welding head.

33. Welding apparatus as defined in claim 32, wherein the said actuating means for pivoting the said welding head comprises a lever arm attached to the welding head.

34. Welding apparatus as defined in claim 32, wherein the said guide rollers are provided with end flanges engaging with the sides of said guide rails to retain the welding head in laterally fixed position on said frame.

35. Welding apparatus as defined in claim 26, wherein the said mounting means for said welding head comprises a parallelogram linkage comprised of four link members pivotally interconnected in a parallelogram manner and including a pair of parallel extending side link members and a pair of parallel extending end link members one of which comprises the said welding head with its axis extending parallel to the other said end link member and its welding nozzle end extending outwardly beyond said linkage, said other end link member extending outwardly of said linkage in the same direction as said welding head nozzle end and being pivotally connected to the said frame to pivotally mount the said linkage for pivotal movement on said frame in the plane of said linkage and in a plane parallel to the plane of the said travel of said carriage around said tube sections and about a pivot center located on said other end link member the same distance from said linkage as the distance therefrom of the said pivot point of the said welding head, said welding head being provided with a pair of guide rollers spaced apart axially thereof and engaged with and riding between a pair of opposed concentric arcuate guide rails on said frame centered on an axis extending normal to the plane of travel of said welding head around the said tube sections and including the said pivot point of said welding head to support the welding head on said frame.

36. Welding apparatus as defined in claim 35, wherein the said guide rollers are provided with end flanges engaging with the sides of said guide rails to retain the welding head in laterally fixed position on said frame.

37. Welding apparatus as defined in claim 26, wherein the said actuating means operates to pivot the said welding head from its said initial drag angle welding position to its said push angle welding position during the continuation of the orbital travel of the said carriage and the welding head in the welding pass thereof around the welding gap without any interruption of the welding operation.

38. Welding apparatus as defined in claim 2, wherein the said mounting means for said welding head comprises an arcuate shaped plate cam fastened to the said welding head in a plane parallel to the plane of travel thereof around the said tube sections and having concentric arcuate opposite side edge cam surfaces engaged with and riding between opposed concentric sets of arcuately arranged guide rollers rotatably mounted on said carriage frame, the said concentric arcuate cam edge surfaces and arcuately arranged guide roller sets being centered on a common axis extending normal to the plane of travel of said welding head around the said tube sections and including the said pivot point of the welding head.

39. Welding apparatus as defined in claim 38, wherein the said actuating means for pivoting said welding head comprises an arcuate rack secured to said arcuate plate cam and concentric with said arcuate side cam edge surfaces and centered on said common axis, and a gear in meshed engagement with said rack and mounted on an actuating shaft supported on said frame and provided with drive means for rotating said shaft.

40. Welding apparatus as defined in claim 39, wherein the said drive means for rotating said actuating shaft comprises a motor and speed reducer unit.

41. Welding apparatus as defined in claim 39, wherein the said drive means for rotating said actuating shaft comprises a hand knob fastened thereon.

42. Welding apparatus as defined in claim 38, wherein the said arcuate plate cam and the said guide rollers engaged therewith are provided with matching V-shaped engaging surfaces serving to retain the welding head in laterally fixed position on said frame.

43. Welding apparatus as defined in claim 2, wherein the said mounting means for said welding head comprises opposed concentric sets of arcuately arranged guide rollers rotatably mounted on said welding head and engaged with and riding between an opposed pair of concentric arcuate guide rails secured to the said carriage frame, the said concentric arcuate guide rails and arcuately arranged sets of guide rollers being centered on a common axis extending normal to the plane of travel of said welding head around the said tube sections and including the said pivot point of the welding head.

44. Welding apparatus as defined in claim 43, wherein the said actuating means for pivoting the said welding head comprises a lever arm attached to the welding head.

45. Welding apparatus as defined in claim 43, wherein the said guide rollers are provided with end flanges engaging with the sides of said guide rails to retain the welding head in laterally fixed position on said frame.

46. Welding apparatus as defined in claim 2, wherein the said mounting means for said welding head comprises a parallelogram linkage comprised of four link members pivotally interconnected in a parallelogram manner and including a pair of parallel extending side link members and a pair of parallel extending end link members one of which comprises the said welding head with its axis extending parallel to the other said end link member and its welding nozzle end extending outwardly beyond said linkage, said other end link member extending outwardly beyond said linkage in the same direction as said welding head nozzle end and being pivotally connected to the said frame to pivotally mount the said linkage for pivotal movement on said frame in the plane of said linkage and in a plane parallel to the plane of the said travel of said carriage around said tube sections and about a pivot center located on said other end link member the same distance from said linkage as the distance therefrom of the said pivot point of the said welding head, said welding head being provided with a pair of guide rollers spaced apart axially thereof and engaged with and riding between a pair of opposed concentric arcuate guide rails on said frame centered on an axis extending normal to the plane of travel of said welding head around the said tube sections and including the said pivot point of said welding head to support the welding head on said frame.

47. Welding apparatus as defined in claim 46, wherein the said guide rollers are provided with end flanges engaging with the sides of said guide rails to retain the welding head in laterally fixed position on said frame.

48. Welding apparatus as defined in claim 2, wherein the said actuating means operates to pivot the said welding head from its said initial drag angle welding position to its said push angle welding position during the continuation of the orbital travel of the said carriage and the welding head in the welding pass thereof around the welding gap without any interruption of the welding operation.

49. Welding apparatus as defined in claim 1, wherein the said mounting means for said welding head comprises an arcuate shaped plate cam fastened to the said welding head in a plane parallel to the travel thereof around the said tube sections and having concentric arcuate opposite side cam edge surfaces engaged with and riding between opposed concentric sets of arcuately arranged guide rollers rotatably mounted on said carriage frame, the said concentric arcuate cam edge surfaces and arcuately arranged guide roller sets being centered on a common axis extending normal to the plane of travel of said welding head around the said tube sections and including the said pivot point of the welding head.

50. Welding apparatus as defined in claim 49, wherein the said actuating means for pivoting said welding head comprises an arcuate rack secured to said arcuate plate cam and concentric with said arcuate side cam edge surface and centered on said common axis, and a gear in meshed engagement with said rack and mounted on an actuating shaft supported on said frame and provided with drive means for rotating said shaft.

51. Welding apparatus as defined in claim 50, wherein the said said drive means for rotating said actuating shaft comprises a motor and speed reducer unit.

52. Welding apparatus as defined in claim 50, wherein the said drive means for rotating said actuating shaft comprises a hand knob fastened thereon.

53. Welding apparatus as defined in claim 49, wherein the said arcuate plate cam and the said guide rollers engaged therewith are provided with matching V-shaped engaging surfaces serving to retain the welding head in laterally fixed position on said frame.

54. Welding apparatus as defined in claim 1, wherein the said mounting means for said welding head comprises opposed concentric sets of arcuately arranged guide rollers rotatably mounted on said welding head and engaged with and riding between an opposed pair of concentric arcuate guide rails secured to the said carriage frame, the said concentric arcuate guide rails and arcuately arranged sets of guide rollers being centered on a common axis extending normal to the plane of travel of said welding head around the said tube sections and including the said pivot point of the welding head.

55. Welding apparatus as defined in claim 54, wherein the said actuating means for pivoting the said welding head comprises a lever arm attached to the welding head.

56. Welding apparatus as defined in claim 54, wherein the said guide rollers are provided with end flanges engaging with the sides of said guide rails to retain the welding head in laterally fixed position on said frame.

57. Welding apparatus as defined in claim 1, wherein the said mounting means for said welding head comprises a parallelogram linkage comprised of four link members pivotally interconnected in a parallelogram manner and including a pair of parallel extending side link members and a pair of parallel extending end link members one of which comprises the said welding head with its axis extending parallel to the other said end link member and its welding nozzle end extending outwardly beyond said linkage, said other end link member extending outwardly of said linkage in the same direction as said welding head nozzle end and being pivotally connected to said frame to pivotally mount the said linkage for pivotal movement on said frame in the plane of said linkage and in a plane parallel to the plane of the said travel of said carriage around said tube sections and about a pivot center located on said other end link member the same distance from said linkage as the distance therefrom of the said pivot point of the said welding head, said welding head being provided with a pair of guide rollers spaced apart axially thereof and engaged with and riding between a pair of opposed concentric arcuate guide rails on said frame centered on an axis extending normal to the plane of travel of said welding head around the said tube sections and including the said pivot point of said welding head to support the welding head on said frame.

58. Welding apparatus as defined in claim 57, wherein the said guide rollers are provided with end flanges engaging with the sides of said guide rails to retain the welding head in laterally fixed position on said frame.

59. Welding apparatus as defined in claim 1, wherein the said actuating means operates to pivot the said welding head from its said initial angled welding position to its said oppositely angled welding position during the continuation of the orbital travel of the said carriage and the welding head in the welding pass thereof around the welding gap without any interruption of the welding operation.

60. Welding apparatus comprising a carriage equipped with a welding head provided with a wire electrode protruding from its top end, said carriage adapted for mounting on a track for travel therealong at a controlled speed to carry said welding head and its protruding wire electrode in a welding path along a welding gap between adjoining metallic members to deposit a weld bead therein, said carriage comprising a support frame on which the said welding head is pivotally mounted, with its said tip end pointing toward and lying adjacent the said welding gap, for pivotal movement in the plane of said welding gap and about a pivot point located on the axis of the welding head and at the tip end of said protruding wire electrode, and actuating means on said support frame operating to pivot the said welding head on said support frame and about said pivot point from an initial angled welding position relative to and in the plane of said welding gap to an oppositely angled welding position in said plane at a selected location of the welding head in its said welding path to deposit a weld bead in said welding gap.

61. Welding apparatus as defined in claim 60, wherein the said welding path of said welding head extends around only a semi-circular portion of a circular said welding gap between said metallic members.

62. Welding apparatus as defined in claim 60, wherein the said welding path of said welding head extends back and forth in a straight path though a plurality of welding passes along a straight line welding gap between said metallic members, and the said actuating means operates to pivot the said welding head, at the end of each said welding pass, to said oppositely angled welding position in which it is inclined forwardly relative to the direction of travel of said welding head along each said welding pass.

63. Welding apparatus as defined in claim 60, wherein the said welding head, when in its said angled welding positions, extends at angles of around 15° to the perpendicular to the said welding gap.

64. The method of forming a weld bead joint between two end-to-end adjoining metal tube sections by orbiting a welding head with a projecting wire electrode in a welding pass thereof around the weld joint between the top of the tube sections and the bottom thereof, which method comprises positioning the welding head and its said projecting wire electrode in an initial drag angle welding position at the top of the tube sections and in the plane of the welding joint and inclined forwardly relative to the direction of travel of said welding head during the welding pass thereof around the weld joint, and when the welding head reaches approximately 120° to 135° of its welding pass, then pivoting the welding head in the plane of the weld joint about a pivot point located on the axis of the welding head at approximately the tip end of the said projecting wire electrode to a push angle welding position inclined rearwardly relative to the direction of travel of said welding head in its said welding pass around the weld joint and maintaining the said welding head in said push angle welding position throughout the remainder of the welding pass thereof to the bottom of the weld joint.

65. The method as set forth in claim 64, wherein the said pivoting of the welding head to its said push angle welding position is performed during the continuation of the said welding pass thereof around the weld joint and without any interruption of the welding operation.

66. The method as set forth in claim 64, wherein the said welding head and its said projecting wire electrode are inclined at angles of around 15° to the radius of the pipe joint passing through the said pivot point of the welding head, when the said welding head and its projecting wire electrode are in their respective said drag angle and push angle welding positions.

67. The method as set forth in claim 66, wherein the said pivoting of the welding head to its said push angle welding position is performed during the continuation of the said welding pass thereof around the weld joint and without any interruption of the welding operation.

* * * * *